United States Patent
Suzuki

(10) Patent No.: US 8,548,061 B2
(45) Date of Patent: Oct. 1, 2013

(54) IMAGE DECODING APPARATUS AND IMAGE DECODING METHOD

(75) Inventor: Junya Suzuki, Kyoto (JP)

(73) Assignee: Panasonic Corporation, Osaka (JP)

( * ) Notice: Subject to any disclaimer, the term of this patent is extended or adjusted under 35 U.S.C. 154(b) by 392 days.

(21) Appl. No.: 12/535,891

(22) Filed: Aug. 5, 2009

(65) Prior Publication Data
US 2010/0080303 A1    Apr. 1, 2010

(30) Foreign Application Priority Data

Aug. 5, 2008   (JP) ................... 2008-201444
Apr. 16, 2009  (JP) ................... 2009-099808

(51) Int. Cl.
*H04N 7/26* (2006.01)
(52) U.S. Cl.
USPC .............. 375/240.25; 375/240.1; 382/233
(58) Field of Classification Search
None
See application file for complete search history.

(56) References Cited

U.S. PATENT DOCUMENTS

| | | | |
|---|---|---|---|
| 5,495,291 A * | 2/1996 | Adams | 375/240.25 |
| 6,310,921 B1 | 10/2001 | Yoshioka et al. | |
| 6,466,622 B2 * | 10/2002 | Katata et al. | 375/240.1 |
| 7,079,583 B2 | 7/2006 | Yoshioka et al. | |
| 2002/0041626 A1 | 4/2002 | Yoshioka et al. | |
| 2005/0147166 A1 | 7/2005 | Shibata et al. | |
| 2007/0046821 A1 * | 3/2007 | Mead et al. | 348/571 |
| 2007/0047660 A1 * | 3/2007 | Mitani et al. | 375/240.25 |
| 2008/0301681 A1 * | 12/2008 | Sakamoto et al. | 718/100 |

FOREIGN PATENT DOCUMENTS

| | | |
|---|---|---|
| JP | 10-341422 | 12/1998 |
| JP | 2000-295616 | 10/2000 |
| JP | 2001-69512 | 3/2001 |
| JP | 2005-175997 | 6/2005 |
| JP | 2007-251605 | 9/2007 |

* cited by examiner

*Primary Examiner* — Christopher S Kelley
*Assistant Examiner* — Mohammed Jebari
(74) *Attorney, Agent, or Firm* — Wenderoth, Lind & Ponack, L.L.P.

(57) ABSTRACT

An image decoding apparatus, which receives a compressed image stream as an input signal and decodes the input signal, includes decoders for decoding the input signal by decoding predetermined data units. A task controller divides a decoding process for the input signal into process steps and allocates a data unit to be processed by each decoder and for each process step. Each process step has a dependency on an order of processing. The task controller detects a processing status of the decoder, and allocates a data unit and a process step to be processed to the decoder, depending on the detected processing status, a dependency between the process steps, and a dependency between frames included in the image stream.

7 Claims, 9 Drawing Sheets

Fig.2A  TASK LIST

| ELEMENT NO. | SLICE TYPE | TASK | POINTERS | PRIORITY |
|---|---|---|---|---|
| E2 | SLICE C | ARITHMATIC DECODING PROCESS | ... | 3 |
| E3 | SLICE C | ARITHMATIC DECODING PROCESS | ... | 3 |
| E5 | SLICE C | ARITHMATIC DECODING PROCESS | ... | 3 |
| E6 | SLICE A | DIFFERENCE IMAGE CREATING PROCESS | ... | 8 |
| ... | ... | ... | ... | ... |
| ... | ... | ... | ... | ... |

Fig.2B  PRIORITY TABLE

| SLICE TYPE | ARITHMATIC DECODING PROCESS | DIFFERENCE IMAGE CREATING PROCESS | DECODED IMAGE CREATING PROCESS |
|---|---|---|---|
| SLICE A | 9 | 8 | 12 |
| SLICE B | 6 | 5 | 11 |
| SLICE C | 3 | 2 | 10 |

Fig.3

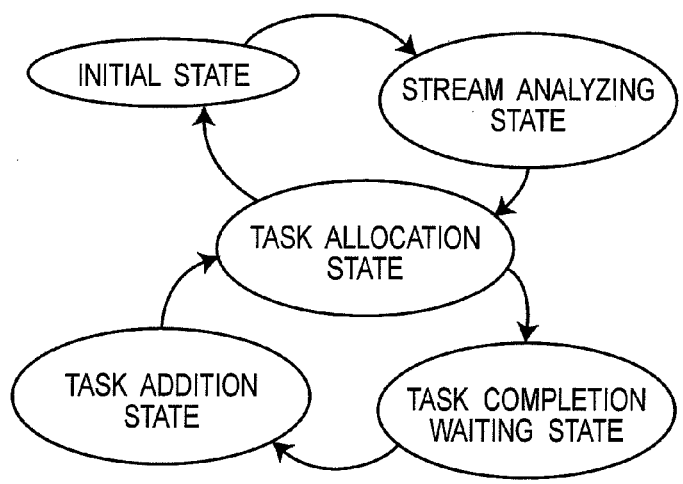

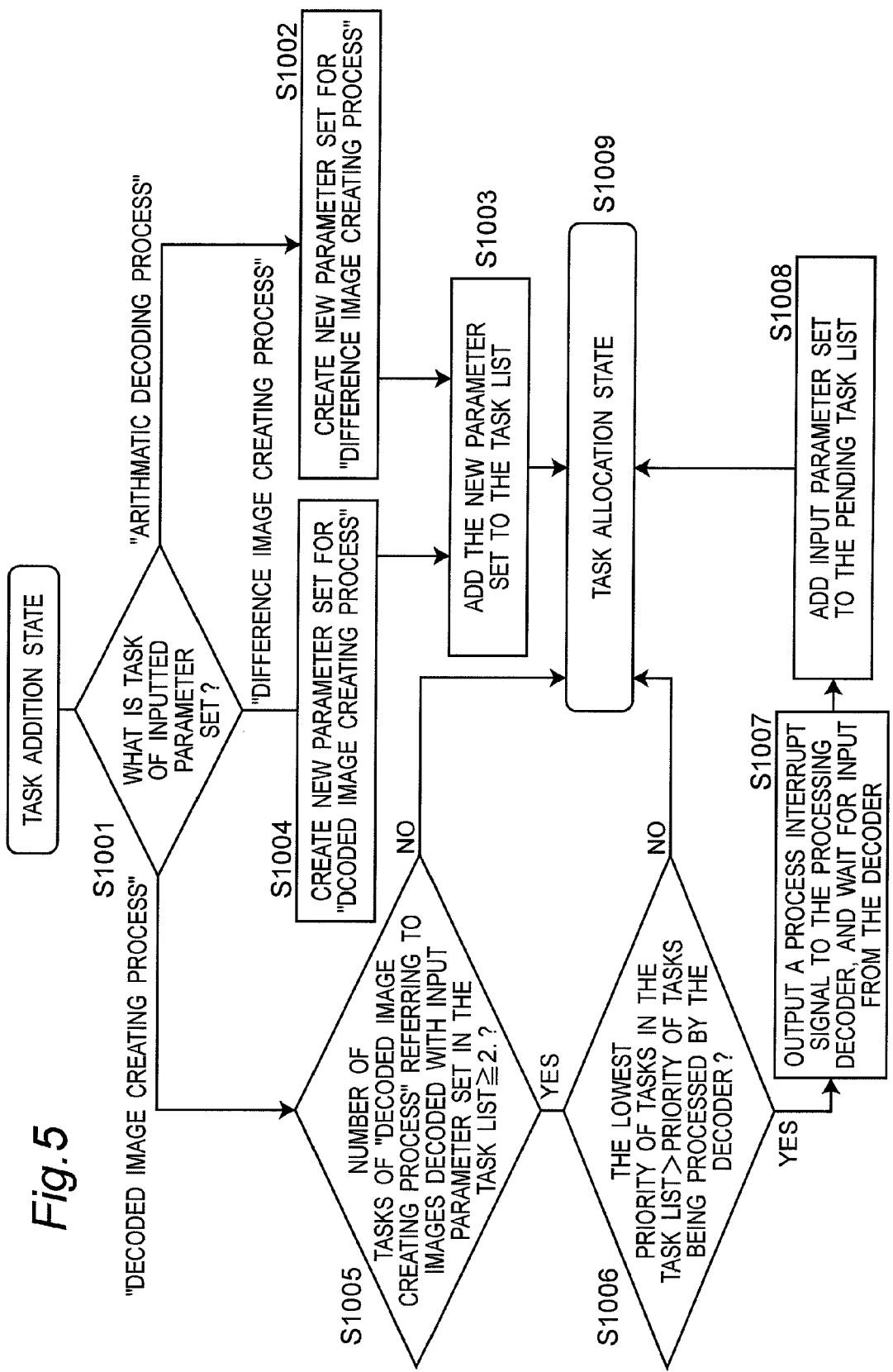

Fig. 6

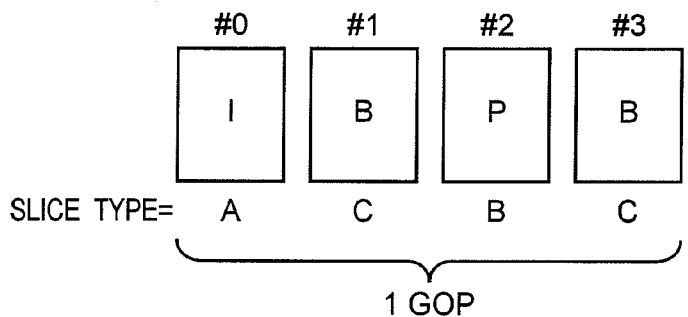

Fig. 7

| SLICE TYPE | ARITHMATIC DECODING PROCESS | DIFFERENCE IMAGE CREATING PROCESS | DECODED IMAGE CREATING PROCESS |
|---|---|---|---|
| SLICE A | 9 | 2 | 1 |
| SLICE B | 3 | 2 | 1 |
| SLICE C | 2 | 2 | 1 |

Fig. 8A

| ELEMENT NO. | SLICE TYPE | TASK | PRIORITY |
|---|---|---|---|
| E1 | SLICE A | ARITHMATIC DECODING PROCESS | 9 |
| E2 | SLICE C | ARITHMATIC DECODING PROCESS | 3 |
| E3 | SLICE B | ARITHMATIC DECODING PROCESS | 6 |
| E4 | SLICE C | ARITHMATIC DECODING PROCESS | 3 |

Fig. 8B

| ELEMENT NO. | SLICE TYPE | TASK | PRIORITY |
|---|---|---|---|
| E2 | SLICE C | ARITHMATIC DECODING PROCESS | 3 |
| E4 | SLICE C | ARITHMATIC DECODING PROCESS | 3 |
| E5 | SLICE B | DIFFERENCE IMAGE CREATING PROCESS | 5 |

*Fig. 8C*

| ELEMENT NO. | SLICE TYPE | TASK | PRIORITY |
|---|---|---|---|
| E2 | SLICE C | ARITHMATIC DECODING PROCESS | 3 |
| E4 | SLICE C | ARITHMATIC DECODING PROCESS | 3 |
| E6 | SLICE B | DECODED IMAGE CREATING PROCESS | 11 |

*Fig. 8D*

| ELEMENT NO. | SLICE TYPE | TASK | PRIORITY |
|---|---|---|---|
| E4 | SLICE C | ARITHMATIC DECODING PROCESS | 3 |
| E6 | SLICE B | DECODED IMAGE CREATING PROCESS | 11 |
| E7 | SLICE C | DIFFERENCE IMAGE CREATING PROCESS | 2 |

*Fig. 8E*

| ELEMENT NO. | SLICE TYPE | TASK | PRIORITY |
|---|---|---|---|
| E6 | SLICE B | DECODED IMAGE CREATING PROCESS | 11 |
| E7 | SLICE C | DIFFERENCE IMAGE CREATING PROCESS | 2 |
| E8 | SLICE A | DIFFERENCE IMAGE CREATING PROCESS | 8 |

*Fig. 8F*

| ELEMENT NO. | SLICE TYPE | TASK | PRIORITY |
|---|---|---|---|
| E6 | SLICE B | DECODED IMAGE CREATING PROCESS | 11 |
| E7 | SLICE C | DIFFERENCE IMAGE CREATING PROCESS | 2 |
| E9 | SLICE C | DIFFERENCE IMAGE CREATING PROCESS | 2 |

Fig. 8G

| ELEMENT NO. | SLICE TYPE | TASK | PRIORITY |
|---|---|---|---|
| E6 | SLICE B | DECODED IMAGE CREATING PROCESS | 11 |
| E9 | SLICE C | DIFFERENCE IMAGE CREATING PROCESS | 2 |
| E10 | SLICE A | DECODED IMAGE CREATING PROCESS | 12 |

Fig. 8H

| ELEMENT NO. | SLICE TYPE | TASK | PRIORITY |
|---|---|---|---|
| E6 | SLICE B | DECODED IMAGE CREATING PROCESS | 11 |
| E9 | SLICE C | DIFFERENCE IMAGE CREATING PROCESS | 2 |
| E11 | SLICE C | DECODED IMAGE CREATING PROCESS | 10 |

Fig. 8I

| ELEMENT NO. | SLICE TYPE | TASK | PRIORITY |
|---|---|---|---|
| E6 | SLICE B | DECODED IMAGE CREATING PROCESS | 11 |
| E11 | SLICE C | DECODED IMAGE CREATING PROCESS | 10 |

Fig. 9

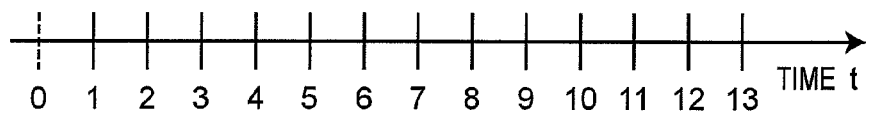

IMAGE DECODING APPARATUS AND IMAGE DECODING METHOD

BACKGROUND

1. Technical Field

The technical field relates to an image decoding apparatus and method which can decode an image compression stream at a high speed.

2. Background Art

As a conventional method of decoding an image stream compressed according to MPEG2, H.264/AVC, or the like at a high speed, a method of dividing a decoding process into slices and allocating each slice to each of a plurality of processors to perform parallel processing in decoding with the plurality of processors, is generally known. However, this method cannot be applied unless one frame is divided into a plurality of slices. When one frame is not divided into a plurality of slices, a method is employed, in which a decoding process is divided in units of frames so that processors perform the divided processes in parallel.

On the other hand, there may be dependence between the compressed frames. For example, in the MPEG-2 standard, I frame can be singularly decoded without depending on other frames. However, P frame is decoded with reference to I frame, and B frame is decoded with reference to I frame and P frame. That is, compressed frames can be grouped according to dependence on other frames in a decoding process.

The frames can be classified into three groups including, for example, group A, group B, and group C. Group A includes a frame which does not refer to other frame, such as I frame. Group B includes a frame which refers to another frame and can be referred to by another frame, such as P frame. Group C includes a frame which refers to another frame but is not referred to by another frame, such as B frame.

That is, the frame belonging to group A does not depend on a decoding result of a frame belonging to any groups. However, the frame belonging to group B depends on a decoding result of a frame belonging to group A and cannot be decoded unless a frame to be referred is decoded. The frame belonging to group C depends on a decoding result of a frame belonging to group A or group B and cannot be decoded unless a frame to be referred is decoded.

Therefore, the frames belonging to group A do not depend on each other, and thus decoding processes for the frames can be performed in parallel. However, a decoding process for a frame belonging to group B and a decoding process for a frame depending on the frame belonging to group C cannot be performed in parallel. For this reason, while one processor performs the process which cannot be done in parallel, the other processor is in an idle state which is a state for waiting process.

In order to decode frames which depend on each other, there is proposed an image decoding method (see JP-A-2000-295616) which determines shares of parallel processes performed by processors according to a dependence of frames. In addition, there is also proposed an image decoding method (see JP-A-2005-175997) which divides one frame into a plurality of slices and process the slices in parallel when decoding a frame which is subjected to bidirectional predictive encoding, and which performs parallel processing in units of frames when decoding a frame which is subjected to the other encoding schemes. By using these methods, idle times of the processors are reduced.

Even though the above stated conventional image decoding process is used, a processor may be in an idle state for a long time. Such an example will be described below with reference to FIG. 12.

In an example in FIG. 12, it is assumed that a decoding process is performed by using four processors in parallel. As frames to be decoded, a total of 6 frames including frames 0 to 5 are used with one frame composed of one slice. Frame 0 belongs to group A to which a frame which does not depend on decoding results of other frames belongs. Frame 3 belongs to group B to which a frame which refers to another frame and is referred to by the other frame, and refers to frame 0. Frames 1, 2, 4, and 5 belong to group C to which a frame which refers to another frame but is not referred to by the other frame, and refer to frames 0 and 3. It is assumed that times required for decoding processes for the respective frames are equal.

Since frames 1 to 5 refer to frame 0, a decoding process for these frames cannot be started until a decoding process for frame 0 is completed. As a result, while frame 0 is being decoded, three of four processors are set in an idle state. After the decoding process for frame 0 is finished, frame 3 can be decoded. Since frames 1, 2, 4, and 5 refer to frame 3, decoding processes for those frames cannot be started until the decoding process for frame 3 is completed. For this reason, while frame 3 is being decoded, three of the four processors are set in an idle state. After the decoding process for frame 3 is completed, parallel processing for frames 1, 2, 4, and 5 can be performed. In this manner, 50% of a time required for all the processes corresponds to an idle time. Specifically, only 50% of the capabilities of the processors can be disadvantageously utilized.

SUMMARY

In order to solve the above problem, it is an object to provide, in a decoding process with parallel processing by a plurality of processors, an image decoding apparatus which can reduce a time for which the processors are in an idle state so that a compressed image can be decoded at a high speed with a low delay.

In a first aspect, an image decoding apparatus is provided, which receives a compressed image stream as an input signal and decodes the input signal. The image decoding apparatus includes a plurality of decoders, each decoder configured to decode the input signal by predetermined data unit, and a task controller configured to divide a decoding process for the input signal into a plurality of process steps and to allocate data unit to be processed by the decoder to the decoder for each process step, each process step having dependency in an order of processing. The task controller detects processing status of the decoder and allocates data unit and process step to be processed to the decoder, depending on the detected processing status, dependency between the process steps, and dependency between frames included in the image stream.

In a second aspect, an image decoding method is provided. The image decoding method includes receiving a compressed image stream as an input signal; dividing a decoding process for the input signal into a plurality of process steps, each process step having dependency in an order of processing; executing the decoding process of the input signal in a predetermined data unit for each process step, by a plurality of decoders; detecting processing status of the decoder; and determining data unit and process step to be processed by the decoder, depending on the detected processing status, dependency between the process steps, and dependency between frames included in the image stream.

In a third aspect, a control program is provided, for an image decoding apparatus which receives a compressed image stream as an input signal and decodes the input signal. The control program makes the image decoding apparatus execute the procedures of: receiving a compressed image stream as an input signal; dividing a decoding process for the input signal into a plurality of process steps, each process step having dependency in an order of processing; executing the decoding process of the input signal in a predetermined data unit for each process step, by a plurality of decoders; detecting processing status of the decoder; and determining data unit and process step to be processed by the decoder, depending on the detected processing status, dependency between the process steps, and dependency between frames included in the image stream.

According to the above aspects, an idle time required in parallel processing of image decoding processes performed by using a plurality of processors can be reduced, so that a decoding process for a compressed image can be performed in higher speed.

BRIEF DESCRIPTION OF DRAWINGS

FIG. 2A is a diagram showing a configuration of a task list, and FIG. 2B is a diagram showing a priority table which manages priorities of tasks for each slice type.

FIG. 3 is a state transition diagram of a task controller.

FIG. 5 is a flow chart showing processes in a task addition state.

FIG. 6 is a diagram showing an example of a byte stream inputted to the image decoding apparatus.

FIG. 7 is a diagram showing an example of times required for the respective processes.

FIGS. 8A to 8I are diagrams for explaining changes of task lists.

FIG. 9 is a diagram showing a process order of decoding parameter sets processed by decoders.

DETAILED DESCRIPTION

Preferred embodiments will be described below with reference to the accompanying drawings.

First Embodiment

An image decoding apparatus according to a first embodiment inputs a byte stream of a video compressed by an encoding method such as H.264, and decodes and outputs a digital image.

1. Configuration of Image Decoding Apparatus

Figure 1:
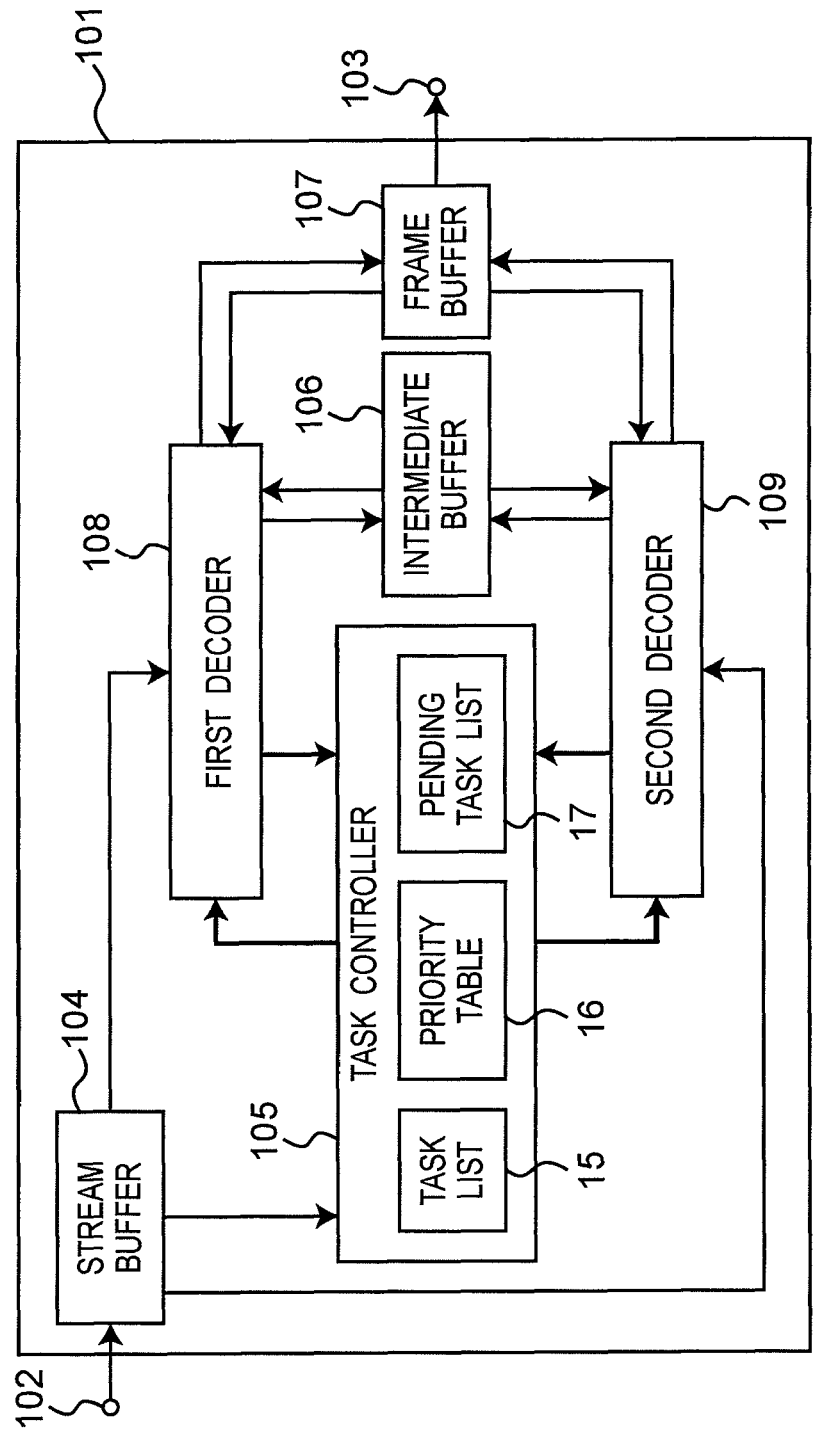
FIG. 1 is a block diagram of an image decoding apparatus according to a first embodiment.

FIG. 1 shows a configuration of an image decoding apparatus according to the first embodiment. An image decoding apparatus 101 receives a byte stream through an input terminal 102 and outputs a digital image obtained by decoding the byte stream through an output terminal 103.

In the image decoding apparatus 101, a stream buffer 104 buffers the inputted byte stream. First and second decoders 108 and 109 perform image decoding processes in units of slices. With the first and second decoders 108 and 109, parallel processing can be achieved. A task controller 105 controls decoding processes executed by the decoders 108 and 109 based on steps (will be described later) of the decoding processes and types of slices. An intermediate buffer 106 stores coefficient data, prediction data, and a difference image which are generated in the decoding processes. A frame buffer 107 stores a decoded image which is finally obtained. Details of the task controller 105 and the decoders 108 and 109 will be described later.

1.1 Step and Slice Type of Image Decoding Process

The image decoding apparatus according to the first embodiment divides a decoding process for one frame into three steps (stages) including an arithmetic decoding process, a difference image creating process, and a decoded image creating process.

The arithmetic decoding process includes a process which decodes coefficient data required to create a difference image from the inputted byte stream and prediction data such as a prediction mode and motion vectors required to create a prediction image. This process does not depend on processes in different frames or different steps.

The difference image creating process is a process which performs inverse quantization, inverse discrete cosine transform, and the like to coefficient data to create a difference image. Although this process does not depend on processes in different frames, it depends on processes in different steps because necessary coefficient data must be decoded by an arithmetic decoding process.

The decoded image creating process creates a prediction image from prediction data and a decoded image required for reference, and synthesizes the prediction image with the difference image to create the decoded image. This process requires that the necessary prediction data is decoded by the arithmetic decoding process, that the necessary difference image is created by the difference image creating process, and that the necessary decoded image is created if reference is necessary. Therefore, the decoded image creating process depends on other processes in different frames and different steps.

Furthermore, the slices are classified into three types based on dependence between frames. As described above, a type of slices composing a frame belonging to group A including a frame which does not refer to another frame is called "slice A". A type of slices composing a frame belonging to group B which includes a frame which refers to another frame and is referred to by other frames is called "slice B". A type of slices composing a frame belonging to group C which includes a frame which refers to other frames and is not referred to by any frame is called "slice C".

1.2 Task Controller

The task controller 105 is connected to the first and second decoders 108 and 109 (to be simply referred to as "decoders" hereinafter). Each of the decoders 108 and 109 can be in a waiting state or a processing state. The task controller 105 stores a task list 15 to manage tasks of decoding processes executed by the decoders 108 and 109 in the task controller 105. The task list 15 manages a decoding parameter set as one element. The decoding parameter set is a pair of parameters required for a decoding process for a slice, and concretely includes the following pieces of information.

slice type (information representing a type of a slice to be decoded)

task (information representing a type of a step of a decoding process executed by the decoder)

slice data pointer (information representing a storing position of slice data on the stream buffer 104)

coefficient data pointer (information representing a storing position of coefficient data on the intermediate buffer 106)

prediction data pointer (information representing a storing position of prediction data on the intermediate buffer 106)

difference image pointer (information representing a storing position of a difference image on the intermediate buffer 106)

FIG. 2A shows an example of the task list 15. The task list 15 manages, in addition to a decoding parameter set, an element number which specifies the decoding parameter set and a priority to a process for the decoding parameter set in association with the element number.

The task controller 105 has a priority table 16. FIG. 2B shows an example of the priority table 16. The priority table 16 is to regulate priorities of steps in the decoding process depending on the slice types. As described above, according to the dependence between the steps, the decoded image creating process, the arithmetic decoding process, and the difference image creating process must be preferentially performed in this order. According to the dependence between the frames, slice type A, slice type B, and slice type C must be preferentially processed in this order. The priority table 16 regulates priorities of the steps depending on the slice types, in consideration of the dependences between the steps and between the frames. A task having a higher priority is preferentially processed.

Furthermore, the task controller 105 stores an pending task list 17 which manages a decoding parameter set as one element to manage a task of which process is interrupted. The task controller 105 always stores priorities of the tasks processed by the first and second decoders 108 and 109.

The task controller 105 can be set in a plurality of states. FIG. 3 shows state transition of the task controller 105. As shown in FIG. 3, the task controller 105 has five states including an initial state, a stream analyzing state, a task allocation state, a task completion waiting state, and a task addition state.

Initial state: Both the first and second decoders 108 and 109 are in the waiting state.

Stream analyzing state: Both the decoders 108 and 109 are in the waiting state (because the stream analyzing state is shifted only from the initial state).

Task allocation state: This state is shifted from another state when at least one of the first and second decoders 108 and 109 is in the waiting state. This state is shifted to the initial state or the task completion waiting state.

Task completion waiting state: Both the first and second decoders 108 and 109 are in the processing state.

Task addition state: This state is shifted from the task completion waiting state, and this state is shifted to the task allocation state.

The states of the task controller 105 will be concretely described below. When the image decoding apparatus 101 starts a byte stream decoding process according to an external command or the like, the task controller 105 starts an operation from the initial state. In the initial state, the numbers of elements in the task list 15 and the pending task list 17 are set to 0. When a necessary byte stream can be read from the stream buffer 104, the initial state is shifted to the stream analyzing state.

In the stream analyzing state, the task controller 105 searches the byte stream read from the stream buffer 104 from the top of the byte stream to detect all slices included in the byte stream. Each time the slice is detected, a new decoding parameter set corresponding to the slice is added to the task list 15. At this time, a new element number is generated and given to the decoding parameter set. The element number may be any number as long as it is not present in the task list 15 at the time. In the new decoding parameter set, a "slice type" is set to the type of the detected slice (any one of slice type A, slice type B, and slice type C), a "task" is set to an "arithmetic decoding process", and a "slice data pointer" is set to a start position in the intermediate buffer 106 for data of the detected slice. At this point of time, a "coefficient data pointer", a "prediction data pointer", and a "difference image pointer" are not set yet. When all the read byte streams are searched and all decoding parameter sets are added to the task list 15, the task controller 105 shifts to the task allocation state.

Figure 4:
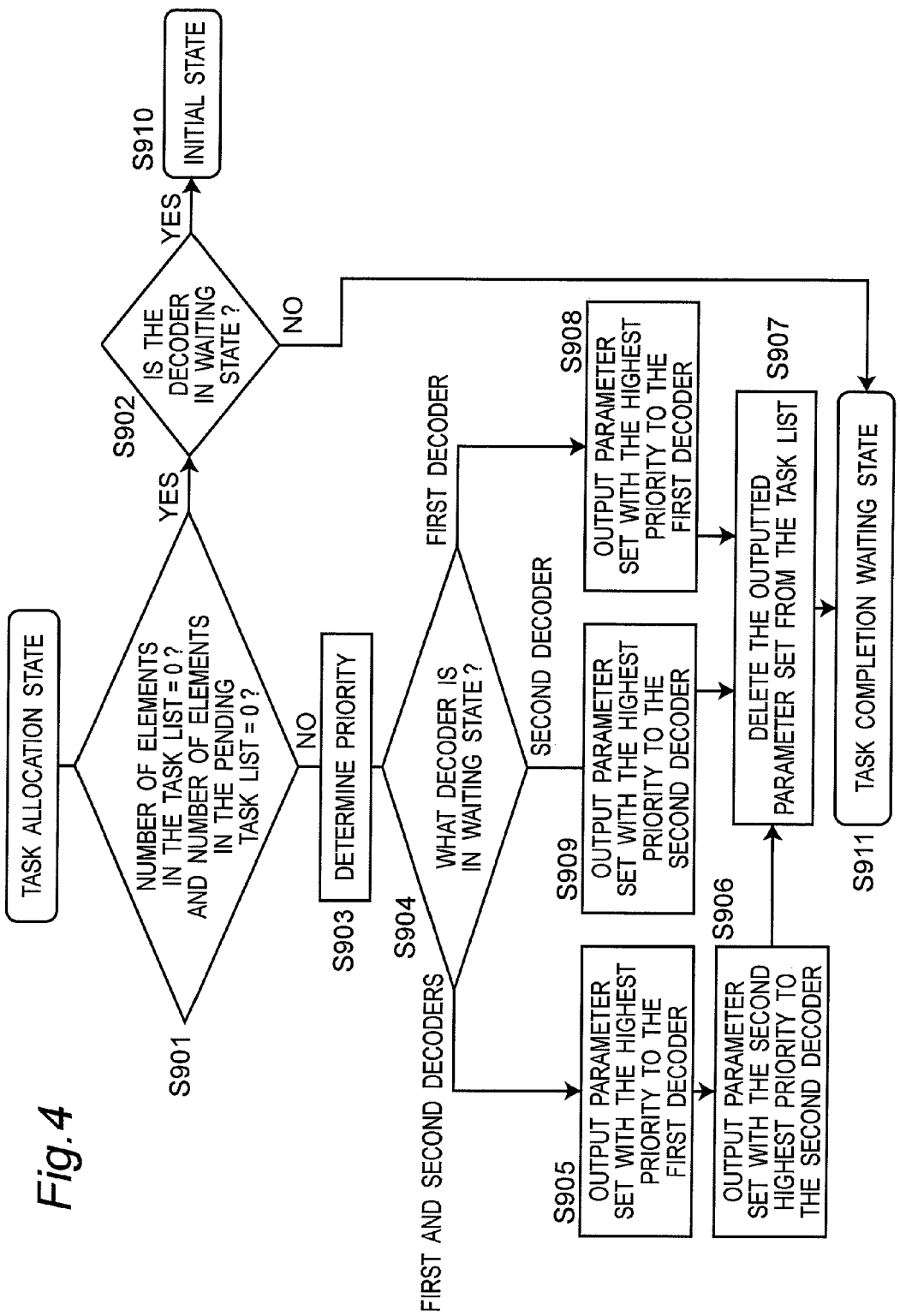
FIG. 4 is a flow chart showing processes in a task allocation state.

A flow chart in the task allocation state is shown in FIG. 4. The task controller 105 shifts to the initial state when the numbers of elements of the task list 15 and the pending task list 17 are 0 ("YES" in S901) and when the first and second decoders 108 and 109 are in the waiting state ("YES" in S902) (S910). When at least one of the number of elements of the task list 15 and the number of the pending task list 17 is not 0 ("NO" in S901), with reference to the priority table 16 shown in FIG. 2B, priorities of the decoding parameter sets included in the task list 15 and the pending task list 17 are determined (S903). The decoder set in the waiting state is determined (S904).

When both the decoders 108 and 109 are in the waiting state, the task controller 105 outputs a decoding parameter set having the highest priority in the task list 15 and the pending task list 17 to the first decoder 108 (S905), and outputs a decoding parameter set having the second highest priority to the second decoder 109 (S906). Thereafter, the task controller 105 deletes the outputted decoding parameter sets from the task list 15 (S907) and shifts to the task completion waiting state (S911).

When only the first decoder 108 is in the waiting state, the task controller 105 outputs a decoding parameter set having the highest priority to the first decoder 108 in the waiting state (S908). Thereafter, the task controller 105 deletes the outputted decoding parameter set from the task list 15 or the pending task list 17 (S907) and shifts to the task completion waiting state (S911).

Similarly, when only the second decoder 109 is in the waiting state, the task controller 105 outputs a decoding parameter set having the highest priority to the second decoder 109 set in the waiting state (S909). Thereafter, the task controller 105 deletes the outputted decoding parameter set from the task list 15 or the pending task list 17 (S907) and shifts to the task completion waiting state (S911).

When a plurality of decoding parameter sets having the same priorities are present in both the task list 15 and the pending task list 17, the decoding parameter set included in the pending task list 17 is preferentially outputted. When a plurality of decoding parameter sets having the same priorities are present in each task list, the decoding parameter sets are preferentially outputted in order of addition of the decoding parameter sets to the task list.

A decoding parameter set of which "slice type" is slice B or slice C and of which "task" is "decoded image creating process" is not outputted to the first and second decoders 108 and 109 when a decoded image creating process for a reference image is not completed. In these cases, a decoding parameter set having next higher priority is outputted to the first and second decoders 108 and 109.

In the task completion waiting state, the task controller 105 waits until the decoding parameter set is inputted from the first decoder 108 or the second decoder 109. When the decoding parameter set is inputted from the first decoder 108 or the second decoder 109, the task controller 105 shifts to the task addition state. When the decoding parameter sets are simultaneously inputted from the plurality of decoders, the task controller 105 shifts to the task addition state to process any one of the decoding parameter sets, while the other decoding parameter sets go into a queue. A decoding parameter set for a task list which is inputted in a state other than the task completion waiting state or a state in which the other decoding parameter set is in the queue also goes into the queue. The queued decoding parameter sets are sequentially processed when the task controller 105 shifts to the task completion waiting state.

A flow chart in the task addition state is shown in FIG. 5. The task controller 105 changes processes depending on a type of a "task" included in the inputted decoding parameter set. When the "task" included in the inputted decoding parameter set is an "arithmetic decoding process", a new decoding parameter set is created by replacing the "task" in the inputted decoding parameter set with a "difference image creating process" (S1002). The new decoding parameter set is added to the task list 15 as an element (S1003), and the task controller 105 shifts to the task allocation state (S1009).

When the "task" included in the inputted decoding parameter set is the "difference image creating process", a new decoding parameter set is created by replacing the "task" in the inputted decoding parameter set with the "decoded image creating process" (S1004). The new decoding parameter set is added to the task list 15 as an element (S1003), and the task controller 105 shifts to the task allocation state (S1009). Information other than the "task" included in the new decoding parameter set is made equal to that of the inputted decoding parameter set.

When the "task" included in the decoding parameter set inputted in the task controller 105 is the "decoded image creating process", the task controller 105 searches the task list 15 for a decoding parameter set which has "task" as a "decoded image process" and refers to a decoded image to be processed by the inputted decoding parameter set. When two or more corresponding decoding parameter sets are found ("YES" in S1005), a priority of a task processed by a decoder which is not in the waiting state is compared with a priority of the decoding parameter set having the lowest priority among the found decoding parameter sets. When the priority of the task processed by the decoder is lower ("YES" in S1006), the task controller 105 outputs a process interrupt signal to the decoder and waits until the decoding parameter set is inputted from the decoder (S1007). After the decoding parameter set is inputted from the decoder, the task controller 105 adds the inputted decoding parameter set to the pending task list 17 (S1008) and shifts to the task allocation state (S1009). Information other than the "task" included in the new decoding parameter set is made equal to that of the inputted decoding parameter set. When the priority of the task processed by the decoder is higher than or equal to the priority of the decoding parameter having the lowest priority ("NO" in S1006), or when the number of corresponding decoding parameter sets is smaller than 2 ("NO" in S1005), the task controller 105 shifts to the task allocation state without performing any operation (S1009).

1.3 Decoder

The first and second decoders 108 and 109 have two states including a waiting state and a processing state. The initial state is a waiting state which waits for input of the decoding parameter set. When the decoding parameter set is inputted, the first or second decoder 108 or 109 shifts from the waiting state to the processing state. In the processing state, the operations of the decoder 108 or 109 changes depending on a "task" included in the inputted decoding parameter set. The operations in the processing state changing depending on the "task" will be described below.

When the "task" is the "arithmetic decoding process", the decoder 108 or 109 reads a byte stream from an address on the stream buffer 104 pointed by a "slice data pointer" included in the inputted decoding parameter set, decodes coefficient data and prediction data, and writes the coefficient data and the prediction data on the intermediate buffer 106. Subsequently, the decoder 108 or 109 outputs a new decoding parameter set, and shifts to the waiting state. In the new decoding parameter set, the "coefficient data pointer" and the "prediction data pointer" are set to pointers to the coefficient data and the prediction data which are written in the intermediate buffer 106. Information other than the "coefficient data pointer" and the "prediction data pointer" is made equal to those in the inputted decoding parameter set.

When the "task" is the "difference image creating process", the decoder 108 or 109 reads coefficient data from an address on the intermediate buffer 106 pointed by a "coefficient data pointer" included in the inputted decoding parameter set, creates a difference image, and writes the difference image in the intermediate buffer 106. Subsequently, the decoder 108 or 109 outputs new decoding parameter sets and then shifts to the waiting state. In the new decoding parameter set, a "difference image pointer" is set to a pointer to the difference image written in the intermediate buffer 106, and information other than the "difference image pointer" is set to be equal to that in the inputted decoding parameter set.

When the "task" is the "decoded image creating process", the decoder 108 or 109 reads the prediction data from addresses on the intermediate buffer 106 pointed by a "prediction data pointer" included in the inputted decoding parameter set. The decoder 108 or 109 reads a decoded image which is required to create a prediction image and decoded in advance from the frame buffer 107 based on the read prediction data, and synthesizes the decoded image with the difference image read from the intermediate buffer 106 to create a decoded image. The created decoded image is written in the frame buffer 107. Subsequently, the decoder 108 or 109 outputs the inputted decoding parameter set as it is and then shifts to the waiting state.

When the decoder 108 or 109 receives a process interrupt signal in the processing state, the decoder 108 or 109 interrupts the process which is being executed at the present, sets various pointers in the decoding parameter set such that the process can be restarted later, and outputs the decoding parameter set.

2. Parallel Decoding Operation

A decoding operation of the image decoding apparatus 101 configured as described above according to the first embodiment will be described below. In the following explanation, the following matters are assumed. The image decoding apparatus 101 receives (inputs) a byte stream composed of one GOP (Group of Pictures) including four frames, i.e., I frame, B frame, P frame, and B frame in this order as shown in FIG. 6, and decodes all the frames. Each frame is composed of one slice. A GOP shown in FIG. 6 includes one slice A, one slice B, and two slices C. All referenced images are included in the same GOP. P frame uses I frame as a reference image, and B frame uses I frame and P frame as reference images.

In order to simplify the explanation, times required for task addition, task deletion, task allocation, state transition, and input/output of a decoding parameter set are set to 0. Time required for each process for slice types A to C is shown in FIG. 7.

In the image decoding apparatus 101, a byte stream received (inputted) through the input terminal 102 is written in the stream buffer 104. Thus, a byte stream to be decoded can be read from the stream buffer 104, and the task controller 105 shifts from the initial state to the stream analyzing state.

In the stream analyzing state, the task controller 105 reads a byte stream from the stream buffer 104 to analyze the byte stream, adds a new decoding parameter set to the task list 15, and then shifts to the task allocation state. The state of the task list 15 obtained in this state is shown in FIG. 8A. In FIG. 8A, to simplify the explanation, an element number representing an order of decoding parameter sets, a "slice type" and a "task" included in each decoding parameter set, and priority of each decoding parameter set are just shown (the same manner as in FIGS. 8B to 8I described below). The "slice data pointer" of each decoding parameter set is set as data start position of each slice.

In the task allocation state, the task controller 105 outputs a decoding parameter set (E1 in FIG. 8A) having the highest priority in the task list 15 to the decoder 108 and outputs a decoding parameter set (E3 in FIG. 8A) having the second highest priority to the decoder 109. Thereafter, the task controller 105 deletes the two outputted decoding parameter sets from the task list 15 and then shifts to the task completion waiting state. Time t obtained at this time is set as 0. FIG. 9 is a diagram showing decoding parameter sets processed by the decoders 108 and 109 along a time axis in an example (will be described below).

As shown in FIG. 9, decoding parameter sets of element number E1 and element number E3 are inputted to the first decoder 108 and the second decoder 109 (Note: "decoding parameter set E1", "decoding parameter set E3", . . . may be simply abbreviated as "E1", "E3", in the following). Thereafter, the first decoder 108 and the second decoder 109 shift from the waiting state to the processing state. In the processing state, the decoders 108 and 109 perform an arithmetic decoding process with reference to the inputted decoding parameter sets.

At time t=3, the second decoder 109 completes E3. Then the second decoder 109 outputs, to the task controller 105, a decoding parameter set obtained by replacing a coefficient data pointer and a prediction data pointer in the decoding parameter set regarding E3 with pointers to the coefficient data and the prediction data obtained by the arithmetic decoding process, and then shifts to the waiting state.

When the task controller 105 receives the decoding parameter set from the second decoder 109, the task controller 105 shifts to the task addition state. The "task" of the received decoding parameter set is the arithmetic decoding process. Therefore, information other than the "task" is the same as that in the received decoding parameter set, the task controller 105 adds a new decoding parameter set E5 in which the "difference image creating process" is set as the "task" to the task list 15, and shifts to the task allocation state. The task list 15 obtained at this time is shown in FIG. 8B. As shown in FIG. 8B, in the task allocation state, the decoding parameter set having the highest priority is E5, the task controller 105 outputs E5 to the decoder 109, and deletes E5 from the task list 15. Thereafter, the task controller 105 shifts to the task completion waiting state.

When the second decoder 109 receives the decoding parameter set (E5) from the task controller 105, the decoder 109 shifts to the processing state again. The decoder 109 performs the difference image creating process with reference to the inputted decoding parameter set.

The second decoder 109 completes the process for E5 at time t=5 (see FIG. 9). The second decoder 109 outputs, to the task controller 105, a decoding parameter set obtained by replacing the pointer to the difference image in the decoding parameter set regarding E5 with a pointer to a difference image obtained by the difference image creating process, and shifts to the waiting state.

When the task controller 105 receives a decoding parameter set from the second decoder 109, the task controller 105 shifts to the task addition state. The "task" of the inputted decoding parameter set represents the "difference image creating process". Therefore, information other than the task is the same as that in the received decoding parameter set. The task controller 105 adds a new decoding parameter set E6 in which a "decoded image creating process" is set as a "task" to the task list 15, and shifts to the task allocation state. The task list 15 obtained at this time is shown in FIG. 8C. As shown in FIG. 8C, the decoding parameter set having the highest priority is E6. However, the decoded image creating process for slice B to be decoded in E6 cannot be executed until the decoded image creating process for slice A is completed. For this reason, E2 which is earlier one added to the task list between E2 and E4 having the next highest priority to E6 in the task list 15 shown in FIG. 8C, is outputted to the decoder 109. E2 is deleted from the task list. Thereafter, the task controller 105 shifts to the task completion waiting state.

When the second decoder 109 receives the decoding parameter set (E2) from the task controller 105, the decoder 109 shifts to the processing state again. The second decoder 109 performs an arithmetic decoding process with reference to the received decoding parameter set.

The second decoder 109 completes the process for E2 at time t=7 (see FIG. 9). The second decoder 109 outputs to the task controller 105 a decoding parameter set obtained by replacing the coefficient data pointer and the prediction data pointer in the decoding parameter set regarding E2 with the coefficient data and the prediction data obtained by the arithmetic decoding process, and shifts to the waiting state.

When the task controller 105 receives the decoding parameter set from the second decoder 109, the task controller 105 shifts to the task addition state. The "task" of the inputted decoding parameter set represents the "arithmetic decoding process". Therefore, information other than the task is the same as that in the received decoding parameter set. The task controller 105 adds a new decoding parameter set E7 in which the "difference image creating process" is set as the "task" to the task list 15, and shifts to the task allocation state. The task list 15 obtained at this time is shown in FIG. 8D. As shown in FIG. 8D, a decoding parameter set having the highest priority is E6. However, the decoded image creating process of the slice B represented by E6 cannot be executed until the decoded image creating process for the slice A is completed. For this reason, the task controller 105 outputs E4 having the next highest priority to E6 to the decoder 109, and deletes E4 from the task list. Thereafter, the task controller 105 shifts to the task completion waiting state. As described above, when a necessary process for a decoding parameter set having the highest priority is not completed, a decoding parameter set having a priority lower than that of the decoding parameter set having the highest priority may be preferentially processed.

When the second decoder 109 receives the decoding parameter set E4 from the task controller 105, the second decoder 109 shifts to the processing state again. The decoder 109 performs the arithmetic decoding process with reference to the received decoding parameter set.

The first decoder 108 and the second decoder 109 completes processes for E1 and E4 at time t=9 (see FIG. 9). The first decoder 108 outputs, to the task controller 105, a decoding parameter set obtained by replacing the coefficient data pointer and the prediction data pointer in E1 with pointers to the coefficient data and the prediction data which are obtained by the arithmetic decoding process, and shifts to the waiting state. The second decoder 109 outputs, to the task controller 105, a decoding parameter set obtained by replacing the coefficient data pointer and the prediction data pointer in E4 with pointers to the coefficient data and the prediction data obtained by the arithmetic decoding process, and shifts to the waiting state. When the two decoders 108 and 109 simultaneously complete the processes and shifts to the waiting state, the task controller 105 starts control of the first decoder 108.

When receiving the decoding parameter sets E1 and E4 from the first decoder 108 and the second decoder 109, respectively, the task controller 105 shifts to the task addition state.

The task controller 105 performs a process for E1. The "task" of the inputted decoding parameter set E1 represents the "arithmetic decoding process". Therefore, information other than the task is the same as that in the received decoding parameter set. The task controller 105 adds a new decoding parameter set E8 in which the "difference image creating process" is set as the "task" to the task list 15 and shifts to the task allocation state. The task list 15 obtained at this time is shown in FIG. 8E. As shown in FIG. 8E, the decoding parameter set having the highest priority is the decoding parameter set E6. However, the decoded image creating process for the slice B cannot be executed until the decoded image creating process for the slice A is completed. For this reason, the task controller 105 outputs E8 having the highest priority next to E6 to the decoder 108 and deletes E8 from the task list 15. Thereafter, the task controller 105 shifts to the task completion waiting state.

Subsequently, with respect to the decoding parameter set E4 inputted from the second decoder 109, the task controller 105 adds a new decoding parameter set E9 to the task list 15 similarly to E1, and shifts to the task allocation state. The task list 15 obtained at this time is shown in FIG. 8F. As shown in FIG. 8F, the decoding parameter set E6 has the highest priority. However, the decoded image creating process for the slice B cannot be executed until the decoded image creating process for the slice A is completed. For this reason, the decoding parameter set E7 of E7 and E9 having the highest priority next to E6, which is earlier added by the task list 15, is outputted to the second decoder 109, and E7 is deleted from the task list. Thereafter, the task controller 105 shifts to the task completion waiting state.

When receiving the decoding parameter set E8 from the task controller 105, the first decoder 108 shifts to the processing state again. Similarly, when receiving the decoding parameter set E7, the second decoder 109 shifts to the processing state again. The first decoder 108 and the second decoder 109 perform a difference image creating process with reference to the inputted decoding parameter set.

The first decoder 108 and the second decoder 109 complete processes for the decoding parameter sets E8 and E7 at time t=11 (see FIG. 9). The decoder 108 outputs a decoding parameter set obtained by replacing the pointer to the difference image in the decoding parameter set E8 with a pointer to the difference image obtained by the difference image creating process, and shifts to the waiting state. The decoder 109 outputs a decoding parameter set obtained by replacing a pointer to the difference image in the decoding parameter set E7 with a pointer to the difference image obtained by the difference image creating process and shifts to the waiting state.

When receiving a decoding parameter set from the decoder 108, the task controller 105 shifts to the task addition state. A "task" of the received decoding parameter set represents the "difference image creating process". Therefore, information other than the task is the same as that in the received decoding parameter set. The task controller 105 adds a new decoding parameter set E10 in which the "decoded image creating process" is set as the "task" to the task list 15, and shifts to the task allocation state. The task list 15 obtained at this time is shown in FIG. 8G. As shown in FIG. 8G, since the decoding parameter set having the highest priority is E10, the task controller 105 outputs E10 to the first decoder 108 and deletes E10 from the task list. Thereafter, the task controller 105 shifts to the task completion waiting state.

When receiving the decoding parameter set from the second decoder 109, the task controller 105 shifts to the task addition state. Similarly, the task controller 105 adds a new decoding parameter set E11 to the task list 15 and shifts to the task allocation state. The task list 15 obtained at this time is shown in FIG. 8H. As shown in FIG. 8H, the priorities of the decoding parameter sets E6 and E11 are higher. However, both the decoding parameter sets E6 and E11 cannot be executed until the decoded image creating process for the slice A is completed. For this reason, the task controller 105 outputs E9 having the highest priority next to E6 and E11 to the decoder 109, and deletes E9 from the task list. Thereafter, the task controller 105 shifts to the task completion waiting state.

When receiving the decoding parameter set E10 from the task controller 105, the first decoder 108 shifts to the processing state again. The first decoder 108 performs the decoded image creating process with reference to the received decoding parameter set. Similarly, when receiving the decoding parameter set E9, the second decoder 109 shifts to the processing state again. The second decoder 109 performs the difference image creating process with reference to the received decoding parameter set.

When the first decoder 108 completes the process for E10 at time t=12 (see FIG. 9), the first decoder 108 outputs the received decoding parameter set E10 as it is to the task controller 105, and shifts to the waiting state.

When the task controller 105 receives the decoding parameter set from the first decoder 108, the task controller 105 shifts to the task addition state. The task list obtained at this time is as shown in FIG. 8I. The "task" of the received decoding parameter set represents the "decoded image creating process". Therefore, the task controller 105 searches the task list 15 for a decoding parameter set which refers to the slice A which is a decoded image created by the task of the decoding parameter set E10. In the example in FIG. 8I, the created decoding parameter sets ("decoded image creating process") which refer to the slice A are the two decoding parameter sets E6 and E11. Therefore, a priority ("2") of the task of E9 being processed by the second decoder 109 which is not in the waiting state is compared with lower one (i.e., a priority "10" of E11) of the priorities of the two searched decoding parameter sets (E6 and E11). In this case, the priority of E9 being processed by the second decoder 109 is lower. Therefore, the task controller 105 interrupts the process for the task of E9 to insert the task of E6 into the process of the second decoder 109. More specifically, the task controller 105 outputs a process interrupt signal to the second decoder 109, and thereafter waits until the decoding parameter set is received (or inputted) from the second decoder 109.

As described above, the process for E9 in the decoder is started once. However, when the processes for the decoding parameter sets E6 and E11 having higher priorities can be performed, the process for E9 is interrupted, and the decoding parameter sets E6 and E11 having the higher priorities are preferentially processed.

When the second decoder 109 receives the process interrupt signal, the decoder 109 interrupts the arithmetic decoding process for E9 being processed at the present, outputs the decoding parameter set E9 to the task controller 105, and shifts to the waiting state. At this time, various pointers in the decoding parameter set E9 are set to values obtained at an interrupt point of time so that the interrupted process can be resumed later.

The task controller 105 shifts to the task allocation state after the decoding parameter set E9 inputted from the second decoder 109 is added to the pending task list 17.

The task list 15 obtained at this time is as shown in FIG. 8I, and two decoders 108 and 109 are in the waiting state. In the task allocation state, the decoding parameter set having the highest parameter set in the task list 15 and the pending task list 17 is E6, and the decoded image creating process for the slice A is already completed. Thus, the task controller 105 outputs E6 to the decoder 108 and deletes E6 from the task list 15. The decoding parameter set having the second highest priority is E11, and the decoded image creating process for the slice A is already completed. Thus, the task controller 105 outputs E11 to the second decoder 109, and deletes E11 from the task list 15. Thereafter, the task controller 105 shifts to the task completion waiting state.

When the first and second decoders 108 and 109 receive the decoding parameter set from the task controller 105, the first and second decoders 108 and 109 shift to the processing state again. The first decoder 108 and the second decoder 109 perform the decoded image creating process with reference to the received decoding parameter set.

Both the first and second decoders 108 and 109 complete the decoded image creating processes at time t=13, output the received decoding parameter sets E6 and E11 to the task controller 105 as they are, and shift to the waiting state.

When receiving the decoding parameter set E6 from the first decoder 108, the task controller 105 shifts to the task addition state. Although the "task" of the received decoding parameter set E6 is the "decoded image creating process", a decoding parameter set which refers to the slice B serving as the created decoded image and has the "task" as the "decoded image creating process" is not present in the task list 15. Therefore, the task controller 105 shifts to the task allocation state without performing any operation. The number of the task list 15 obtained at this time is 0. The task controller 105 refers to the pending task list 17. Since the decoding parameter set E9 is present in the pending task list 17, the task controller 105 outputs E9 to the first decoder 108 and deletes E9 from the pending task list 17. Thereafter, the task controller 105 shifts to the task completion waiting state.

When receiving the decoding parameter set E11 from the second decoder 109, the task controller 105 shifts to the task addition state. The "task" of the received decoding parameter set E11 is the "decoded image creating process". However, a decoding parameter set which refers to the slice C as the created decoded image and has the "task" as the "decoded image creating process" is not present in the task list 15. For this reason, the task controller 105 shifts to the task allocation state without performing any operation. The number of elements of the task list obtained at this time is 0. Although the number of elements of the pending task list 17 is also 0, since the first decoder 108 is processing, the task controller 105 shifts to the task completion waiting state without any operation.

A time sequence for the decoding parameter sets processed by the first decoder 108 and the second decoder 109 as described above is shown in FIG. 9. It should be noted that the process for the decoding parameter set E9 is temporarily interrupted and restarted thereafter.

The decoding process for the slice C is similarly repeated to complete decoding of one GOP.

According to the above method, even before a decoding process for a frame belonging to group A is completed, a decoding process for a frame belonging to group B or group C can be started, and thus an idle time of the decoder (processor) can be reduced.

In the first embodiment, the number of decoders is explained as two. However, the number of decoder may be three or more. In the first embodiment, the number of slices included in one frame is explained as one. However, the number of slices may be two or more.

Second Embodiment

Figure 10:
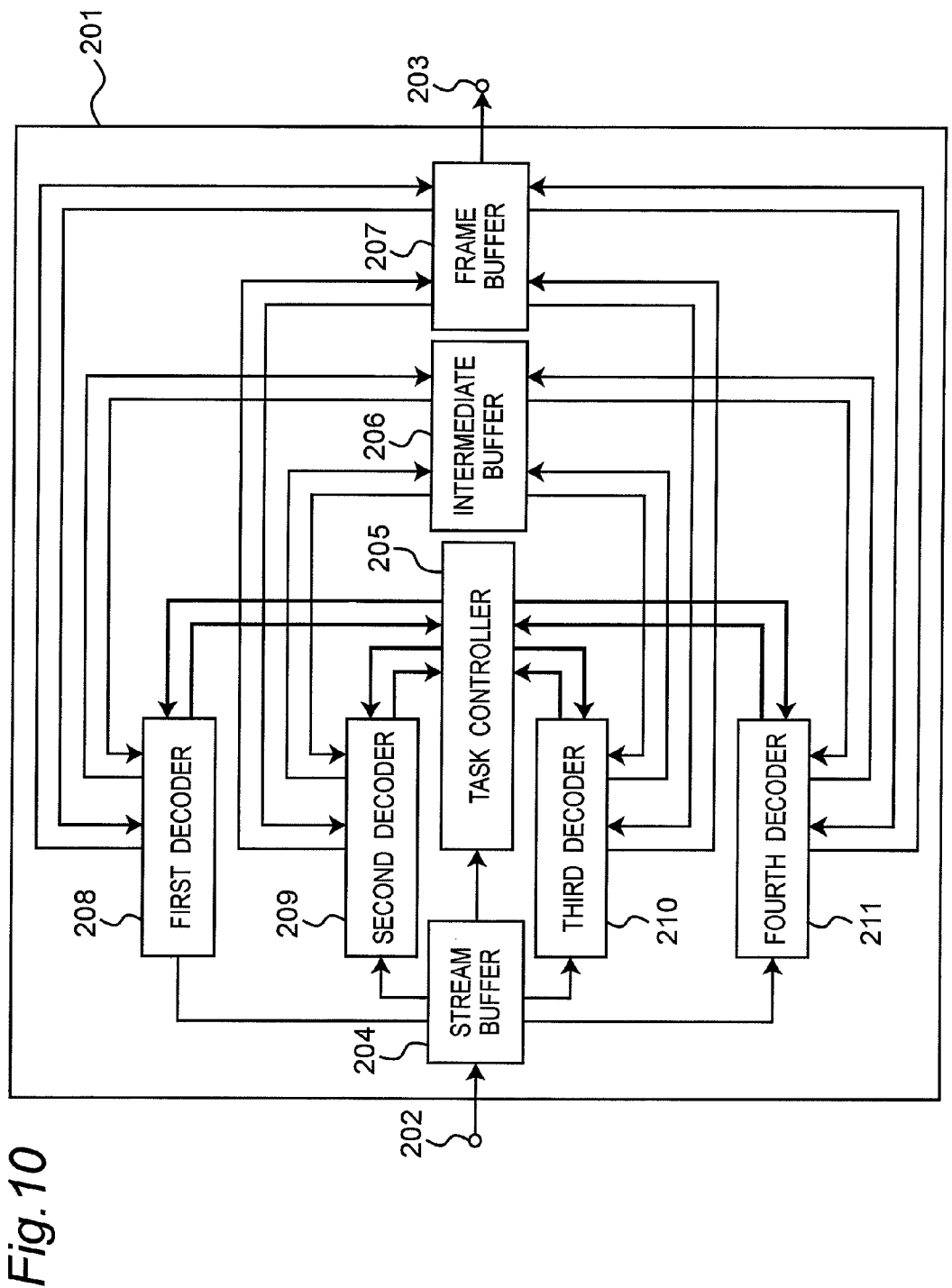
FIG. 10 is a block diagram of an image decoding apparatus according to a second embodiment.

An image decoding apparatus according to a second embodiment receives a byte stream of a video data compressed in an encoding method such as H.264 and outputs a decoded digital image. FIG. 10 shows a configuration of the image decoding apparatus according to the second embodiment. Also in the second embodiment, as in the first embodiment, a decoding process for one frame is divided into three steps including an arithmetic decoding process, a difference image creating process, and a decoded image creating process.

An image decoding apparatus 201 has the same functions as those of the image decoding apparatus 101 according to the first embodiment. The image decoding apparatus 201 receives (inputs) a byte stream from an input terminal 202 and outputs a digital image from an output terminal 203. A stream buffer 204, a task controller 205, an intermediate buffer 206, and a frame buffer 207 operate in the same manner as the stream buffer 104, the task controller 105, the intermediate buffer 106, and the frame buffer 107 described in the first embodiment, respectively. First to fourth decoders 208 to 211 operate in the same manner as the first decoder 108 and the second decoder 109 according to the first embodiment.

Figure 11:
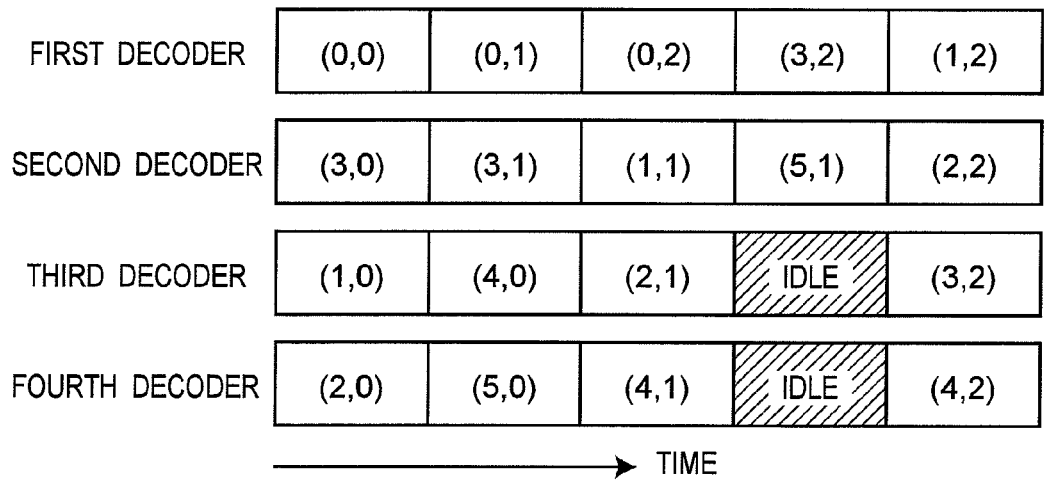
FIG. 11 is a diagram for explaining frames and steps processed by decoders in the second embodiment.
Figure 12:
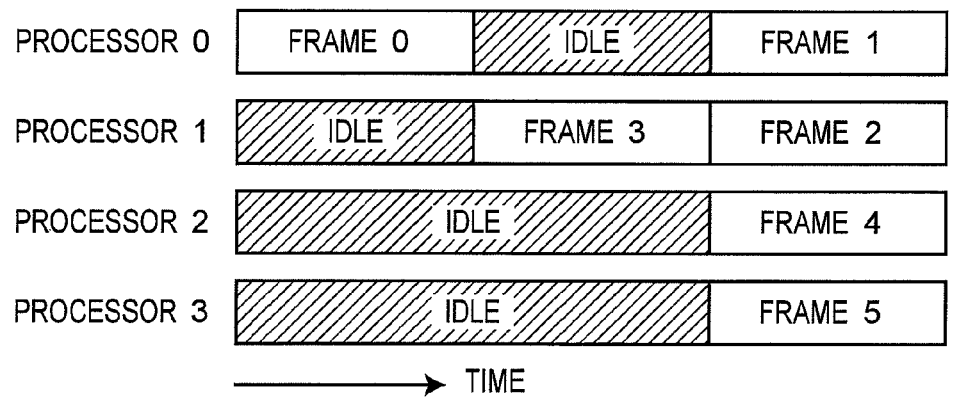
FIG. 12 is a diagram showing parallel processing with conventional four processors.

FIG. 11 shows frames and steps processed by the first to fourth decoders 208 to 211 in the second embodiment. Regarding the figures in parenthesis shown in FIG. 11, the first number in parentheses represents a frame number of a frame to be processed, and a second number in parentheses represents a step in a decoding process. Regarding the step in the decoding process, an arithmetic decoding process is defined as "0", a difference image creating process is defined as "1", and a decoded image creating process is defined as "2". For example, with respect to a process which is performed for the first time by the first decoder 208, (0,0) is shown in FIG. 11. This means an "arithmetic decoding process" for "frame 0". In comparison with a conventional case in FIG. 12, it can be understood that a time for which the decoder is in an idle state is considerably reduced and that a time required for all the processes is also reduced.

The second embodiment exemplifies that one GOP is entirely decoded. However, the stream buffer 104 may buffer only a necessary byte stream, or the task controller 105 may be configured not to output an unnecessary decoding parameter set. In this manner, one arbitrary frame can be decoded. A plurality of GOPs may also be decoded in block.

The functions of the image decoding apparatuses explained in the first and second embodiments may be realized by hardware-such as an electron IC circuit or may be realized by a combination of a computer such as a CPU and a control program (software).

According to an image decoding apparatus of the present invention, even though frames depend on each other, an idle time of a processor can be shortened, and a decoding process can be performed at a high speed. Therefore the image decoding apparatus is useful to a software decoder or the like operated on a multiprocessor.

The specific embodiments are described above. However, many other modifications, corrections, and other applications are apparent to a person skilled in the art. For this reason, the present invention is not limited to the specific disclosure mentioned here, and can be limited to only the appended claims. This application is related to Japanese Patent Application No. 2008-201444 (filed on Aug. 5, 2008) and Japanese Patent Application No. 2009-099808 (filed on Apr. 16, 2009). The contents of the applications are incorporated herein by reference.

What is claimed is:

1. An image decoding apparatus which receives a compressed image stream as an input signal and decodes the input signal, comprising:
    a plurality of decoders, each decoder configured to decode the input signal by decoding a predetermined data unit; and
    a task controller configured to divide a decoding process for decoding a single frame from the compressed image stream received as the input signal into a plurality of process steps for decoding the single frame and to allocate a data unit to be processed to a decoder for each process step, each process step having a dependency on an order of processing,
    wherein the task controller detects a processing status of the decoder, determines a processing order of the plurality of process steps for a plurality of slices belonging to different frames based on the detected processing status, a dependency between the process steps, and a dependency between the different frames included in the image stream, and allocates the data unit and a process step to be processed to the decoder in accordance with the determination of the processing order of the plurality of process steps, and
    wherein the plurality of process steps includes:
    an arithmetic decoding step of decoding coefficient data required to create a difference image from the received image stream and prediction data required to create a prediction image, the prediction data containing a prediction mode or motion vectors;
    a process difference image creating step of creating the difference image by performing inverse quantization and inverse orthogonal transformation to the coefficient data; and
    a decoded image creating step of creating the prediction image from the prediction data and the decoded image required for reference, and synthesizing the prediction image with the difference image to create a decoded image; and
    when a priority of a data unit which is currently being decoded by the decoder is lower than a priority of a data unit waiting to be decoded by a decoding process and when another process required for the data unit waiting to be decoded by the decoding process is completed, the task controller interrupts a process for the data unit currently being decoded and allocates the data unit waiting to be decoded by the decoding process to the decoder.

2. The image decoding apparatus according to claim 1, wherein the dependency between frames is a relationship representing whether one frame refers to another frame or whether one frame is referred to by another frame.

3. The image decoding apparatus according to claim 1, wherein
    the task controller includes priority information which defines the order of data units to be preferentially processed in consideration of the dependency between frames and the dependency between process steps, and allocates the data unit to be processed and the process step to the decoder with reference to the priority information.

4. The image decoding apparatus according to claim 1, wherein the predetermined data unit is a frame or a slice.

5. The image decoding apparatus according to claim 1, wherein an encoding method applied to the image stream is H.264.

6. An image decoding method, comprising:
    receiving a compressed image stream as an input signal;
    dividing a decoding process for decoding a single frame from the compressed image stream received as the input signal into a plurality of process steps for decoding the single frame, each process step having a dependency on an order of processing;
    executing the decoding process of the input signal for a predetermined data unit in each process step, each process step being performed by a corresponding decoder of a plurality of decoders;
    detecting processing status of a decoder;
    determining a processing order of the plurality of process steps for a plurality of slices belonging to different frames based on the detected processing status, a dependency between the process steps, and a dependency between the different frames included in the image stream; and
    allocating a data unit and a process step to be processed by the decoder in accordance with the determination in the determining of the processing order of the plurality of process steps,
    wherein the plurality of process steps includes:
    an arithmetic decoding step for decoding coefficient data required to create a difference image from the received image stream and prediction data required to create a prediction image, the prediction data containing a prediction mode or motion vectors;
    a process difference image creating step for creating the difference image by performing inverse quantization and inverse orthogonal transformation to the coefficient data; and
    a decoded image creating step for creating the prediction image from the prediction data and the decoded image required for reference, and synthesizing the prediction image with the difference image to create a decoded image; and
    when a priority of a data unit which is currently being decoded by the decoder is lower than a priority of a data unit waiting to be decoded by a decoding process and when another process required for the data unit waiting to be decoded by the decoding process is completed, a process for the data unit currently being decoded is interrupted and the data unit waiting to be decoded by the decoding process is allocated to the decoder.

7. A non-transitory computer readable recording medium storing a control program for controlling a controller of an image decoding apparatus which receives a compressed image stream as an input signal and decodes the input signal, the control program causing the image decoding apparatus to perform steps comprising:

receiving a compressed image stream as an input signal;

dividing a decoding process for decoding a single frame from the compressed image stream received as the input signal into a plurality of process steps for decoding the single frame, each process step having a dependency on an order of processing;

executing the decoding process of the input signal in a predetermined data unit for each process step, each process step being performed by a corresponding decoder of a plurality of decoders;

detecting processing status of a decoder;

determining a processing order of the plurality of process steps for a plurality of slices belonging to different frames based on the detected processing status, a dependency between the process steps, and a dependency between the different frames included in the image stream; and allocating a data unit and a process step to be processed by the decoder in accordance with the determination in the determining of the processing order of the plurality of process steps, wherein the plurality of process steps includes:

an arithmetic decoding step for decoding coefficient data required to create a difference image from the received image stream and prediction data required to create a prediction image, the prediction data containing a prediction mode or motion vectors;

a process difference image creating step for creating the difference image by performing inverse quantization and inverse orthogonal transformation to the coefficient data; and a decoded image creating step for creating the prediction image from the prediction data and the decoded image required for reference, and synthesizing the prediction image with the difference image to create a decoded image; and when a priority of a data unit which is currently being decoded by the decoder is lower than a priority of a data unit waiting to be decoded by a decoding process and when another process required for the data unit waiting to be decoded by the decoding process is completed, a process for the data unit currently being decoded is interrupted and the data unit waiting to be decoded by the decoding process is allocated to the decoder.

* * * * *